UNITED STATES PATENT OFFICE 2,498,616

POLYMERIZATION PRODUCTS OF STYRENE

William S. Emerson, Dayton, Ohio, assignor to Monsanto Chemical Company, St. Louis, Mo., a corporation of Delaware No Drawing. Application July 23, 1945, Serial No. 606,715

6 Claims. (Cl. 260—78.5)

The present invention relates to new copolymerization (or interpolymerization) products of styrene.

An object of the present invention is to provide polymerization products of styrene which have improved strength, particularly at elevated temperatures, as compared with polystyrene itself.

I have found that valuable polymerization products are obtained by polymerizing monomeric styrene in admixture with one or more unsaturated nitriles having the general formula:

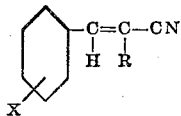

where X is one of the group consisting of hydrogen or alkoxy and R is one of the group consisting of cyano and COOY, where Y is an alkyl radical having from 1 to 5 carbon atoms. Examples of compounds herein contemplated are benzalmalononitrile (alpha-cyanocinnamonitrile), ethyl alpha-cyanocinnamate, ethyl alpha-cyano-p-methoxy cinnamate. In the above formula, X may be any alkoxy radical such as methoxy, ethoxy, propoxy, butoxy, etc.

The above nitriles are characterized as alpha-substitution products of cinnamonitrile, the substituents being restricted to the class consisting of CN and COOalk. These substituents cause an appreciable increase in the thermal properties of the resin as compared with the unsubstituted cinnamonitrile. In the present compounds, alkoxy groups may also be substituted in the ring.

The present copolymers are characterized by possessing valuable thermal properties, particularly by exhibiting a pronounced ability to withstand mechanical distortion at elevated temperatures. However, in spite of the resistance to distortion at elevated temperatures, the present products may be molded by compression or injection methods to give molded articles useful for a variety of purposes.

For most purposes the interpolymer as produced by polymerizing a mixture of styrene and one or more of unsaturated nitriles, above mentioned, are generally employed as such for molded products without the presence of plasticizing agents. However, for certain purposes I have found that the interpolymers may be plasticized without seriously impairing certain of the desirable properties of the interpolymer.

Polymerization of the mixtures of styrene and the herein disclosed unsaturated nitriles may be carried out by any of the usual methods of polymerization, i. e., they may be polymerized in mass, in aqueous emulsion or in solutions. When employing mass polymerization, solutions of monomeric styrene, and any of the unsaturated nitriles disclosed, may be polymerized at temperatures between 70° C. and 125° C., although for certain purposes these temperature limits may be exceeded.

When the interpolymers are formed by emulsion polymerization methods, an emulsion of the mixture of substances to be interpolymerized is made in an aqueous solution using suitable emulsifying agents such as soap, and the emulsion then subjected to a polymerizing temperature which may vary from 25° C. up to the boiling point of water.

The polymerization may be carried out either in the absence or in the presence of polymerization catalysts such as oxygen liberating compounds, particularly benzoyl peroxide, etc.

For the preparation of suitable transparent products having a high strength, I prefer to employ the herein disclosed unsaturated nitriles in amounts of from at least 1% by weight up to 50% by weight in the styrene-unsaturated nitrile mixture.

The invention is illustrated, but not limited, by the following examples:

Example 1

50 g. of a mixture comprising 70 parts by weight of styrene and 30 parts by weight of alpha-cyanocinnamonitrile (prepared by reaction of malononitrile with benzaldehyde) is polymerized in the presence of 0.1% of benzoyl peroxide at 80° C. for 13 days and then at 130° C. for 6 days. The resulting polymer is a clear, colorless, hard resin having an alcohol-soluble content of 2.6%, a softening point of 130° C., a melting point of 220° C. and a decomposition point of 230° C.

Example 2

50 g. of a mixture comprising 70 parts by weight of styrene and 30 parts by weight of ethyl alpha-cyanocinnamate (prepared by reaction of benzaldehyde with ethyl cyanoacetate) is polymerized in the absence of a polymerizing catalyst at a temperature of 80° C. for 10 days and then at a temperature of 130° C. for 6 days. The resulting polymer is a clear, colorless, hard resin having an alcohol-soluble content of 1.0%, a softening point of 150° C., a melting point of 225° C. and a decomposition point of 230° C.

Example 3

10 g. of a mixture comprising 90 parts by weight of styrene and 10 parts by weight of ethyl alpha-cyano-p-methoxy-cinnamate (prepared by reaction of anisaldehyde with ethyl cyanoacetate) is polymerized in the presence of 0.1% of benzoyl peroxide at 80° C. for 11 days. The resulting polymer is a clear, hard resin having an alcohol-soluble content of 2.4%, a softening point of 135° C., a melting point of 200° C., and a decomposition point of 215° C.

Example 4

100 g. of a mixture consisting of 85 g. of styrene and 15 g. of benzalmalonitrile was mass polymerized at 100° C. for 24 hours. The polymeric product was then dissolved in benzol and the solution so formed poured into methyl alcohol. A flocculent, white precipitate was recovered, dried and molded into the form of a heat distortion bar. A sample of the precipitated polymer was also analyzed for combined nitrogen, the analysis indicating the presence in the interpolymer of 17.2% of copolymerized benzalmalonitrile.

The heat distortion point, determined upon the molded bar according to the ASTM method, was 108° C.

For comparison, the heat distortion point of polystyrene was found to be 76° C.

Example 5

100 g. of a mixture containing 85 parts of styrene and 15 parts of ethyl alpha-cyanocinnamate was copolymerized in mass by the method described in Example 4. The solvent-purifier copolymer recovered was found to have a copolymerized ethyl alpha-cyanocinnamate content of 16.0%. A heat distortion bar molded from this copolymer showed an ASTM heat distortion point of 99° C.

Example 6

100 g. of a mixture containing 85 g. of styrene and 15 g. of ethyl alpha-cyano-p-methoxy cinnamate was polymerized by the method described in Example 4. The copolymer recovered from solvent precipitation was found to have a combined ethyl alpha-cyano-p-methoxy cinnamate content of 14.2%. The heat distortion point determined upon this interpolymer gave a value of 94° C.

Example 7

A mixture containing by weight 60% styrene, 20% of benzalmalononitrile and 20% of acrylonitrile was polymerized at 100° C. for 24 hours. The product obtained was a clear, yellow resin.

Mixtures similar in composition to the above, but containing methyl acrylate, methyl methacrylate and maleic anhydride, respectively, in place of acrylonitrile, were also polymerized under the same conditions. The resinous products obtained were slightly hazy to turbid products.

Example 8

A mixture containing by weight 60% styrene, 20% of ethyl alpha-cyanocinnamate and 20% of acrylonitrile was polymerized under the same conditions as in Example 7 above. The product was a clear, yellow resin. Somewhat turbid products were obtained when the acrylonitrile was replaced, respectively, with methyl acrylate, methyl methacrylate and maleic anhydride.

Other modes of applying the principle of my invention may be employed instead of those explained, change being made as regards the polymerization process, the temperature, time of polymerization and proportion of monomeric reactants employed.

This application is a continuation-in-part of my application Serial No. 450,531, filed July 11, 1942 now abandoned.

What I claim is:

1. The process of forming a resinous product which comprises polymerizing a mixture of styrene and benzalmalononitrile, said mixture containing between 1% and 50% by weight of said benzalmalononitrile with the balance being styrene.

2. The process of forming a resinous product which comprises polymerizing a mixture of styrene and ethyl alphacyanocinnamate, said mixture containing between 1% and 50% by weight of said ethyl alpha-cyanocinnamate with the balance being styrene.

3. A resinous material comprising an interpolymer of styrene and benzalmalononitrile, said interpolymer containing between 1% and 50% by weight of said benzalmalononitrile with the balance being styrene.

4. A resinous material comprising an interpolymer of styrene and ethyl alpha-cyanocinnamate, said interpolymer containing between 1% and 50% by weight of said ethyl alpha-cyanocinnamate with the balance being styrene.

5. The process of forming a resinous product which comprises heating a mixture of from 50 to 99 percent by weight of styrene and from one to 50 percent of a compound having the structural formula:

$$R-O-\overset{O}{\underset{\|}{C}}-\underset{|}{\overset{CN}{C}}=CH-\!\!\!\left\langle\!\!\!\begin{array}{c}\\ \\ \end{array}\!\!\!\right\rangle\!\!\!-R'$$

wherein R is an alkyl group having from one to five carbon atoms, and R' is a radical of the group consisting of hydrogen and alkoxy having from one to four carbon atoms, and recovering the said resinous product.

6. A copolymer of 50 to 99 percent by weight of styrene and from one to 50 percent of the compound having the structural formula:

$$R-O-\overset{O}{\underset{\|}{C}}-\underset{|}{\overset{CN}{C}}=CH-\!\!\!\left\langle\!\!\!\begin{array}{c}\\ \\ \end{array}\!\!\!\right\rangle\!\!\!-R'$$

wherein R is an alkyl group having from one to five carbon atoms, and R' is a radical of the group consisting of hydrogen and alkoxy having from one to four carbon atoms, and recovering the said resinous product.

WILLIAM S. EMERSON.

REFERENCES CITED

The following references are of record in the file of this patent:

UNITED STATES PATENTS

| Number | Name | Date |
| --- | --- | --- |
| 2,383,921 | Soday | Aug. 28, 1945 |
| 2,380,063 | Mowry | July 10, 1945 |
| 2,398,321 | Mowry | Apr. 9, 1946 |